(No Model.)
T. TERRELL.
BICYCLE SUPPORTING STAND.
No. 576,002.      Patented Jan. 26, 1897.
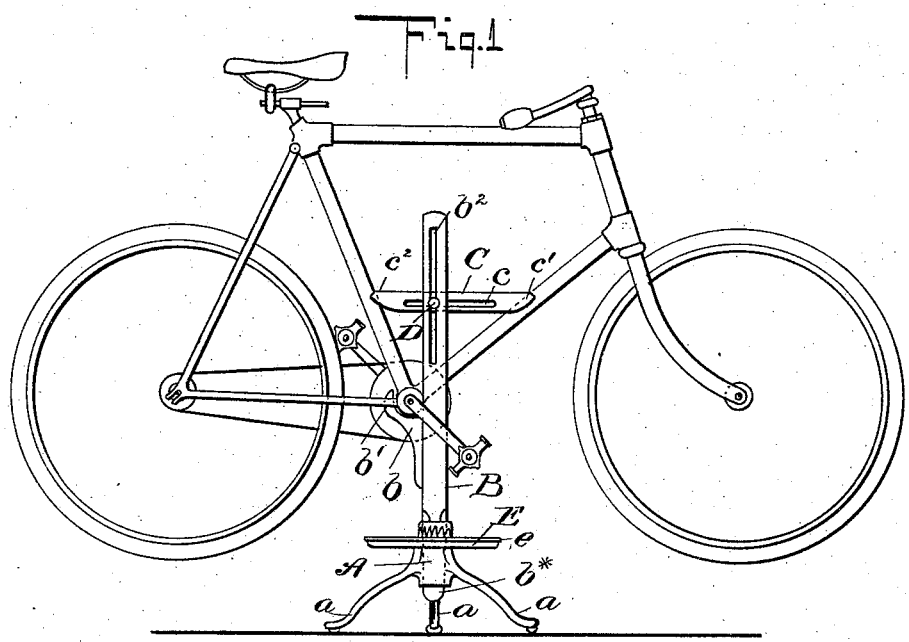
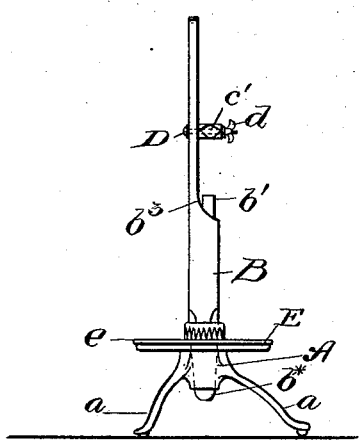
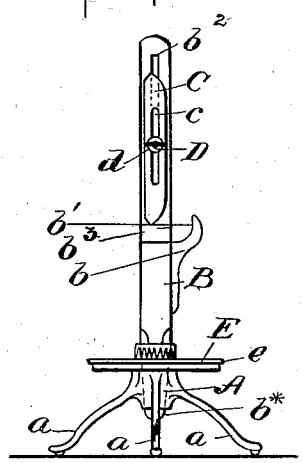
Witnesses
Edmund A. Strauss
W. B. Seward
Inventor
Theodore Terrell
by attorneys
Brown & Seward

UNITED STATES PATENT OFFICE.

THEODORE TERRELL, OF YONKERS, NEW YORK.

BICYCLE-SUPPORTING STAND.

SPECIFICATION forming part of Letters Patent No. 576,002, dated January 26, 1897.

Application filed February 21, 1896. Serial No. 580,161. (No model.)

*To all whom it may concern:*

Be it known that I, THEODORE TERRELL, of Yonkers, in the county of Westchester and State of New York, have invented a new and useful Improvement in Bicycle-Supporting Stands, of which the following is a specification.

My invention relates to an improvement in bicycle-supporting stands, the object being to provide a stand of the above class in which the bicycle may be firmly secured in position with its wheels spaced from the floor.

A further object is to provide a stand in which bicycles having different styles of frames may be secured in position because of the adjustability of the said stand.

A practical embodiment of my invention is represented in the accompanying drawings, in which—

Figure 1 is a back view of my improved stand, a bicycle being shown held in position thereon. Fig. 2 is an edge view of the stand; and Fig. 3 is a front view of the stand, the brace in this view being shown swung around parallel with the upright.

The base of the stand is denoted by A, and in the present instance it is shown as provided with three legs $a$. This base is provided with a suitable socket for the reception of the lower end $b^*$ of the upright B. The upright B is provided with a bracket $b$ upon one of its sides a short distance above the base A, which bracket supports the crank-hanger of a bicycle when the bicycle is in position on the stand. This bracket $b$ is provided with a suitable retaining-horn $b'$, which extends upwardly between the lower rear braces of the bicycle-frame to still further steady the bicycle.

The brace which is adapted to secure the bicycle rigidly to the stand is denoted by C, and it is adjustably secured to the upright B in the following manner: The upright B is provided with an elongated slot $b^2$, which extends from near the top of the upright longitudinally along the same. The brace C is also provided with an elongated slot $c$. A pivot-bolt D extends through the slots in the upright and brace and is provided with a suitable clamping thumb-nut $d$. It will thus be seen that the said brace C may be adjusted longitudinally and may also be rotated to any desired point, and, furthermore, is allowed a vertical adjustment with respect to the upright. The ends of the brace C are preferably grooved slightly, as shown at $c'$ $c^2$, so that they may substantially fit the tubes of the bicycle-frame when the brace is placed in position.

The body of the upright B is reduced considerably, as shown at $b^3$, from a point opposite the bracket $b$, so that the front lower brace of the bicycle may extend along directly beneath the brace C without making the said brace too wide and without necessitating the mounting of the bracket $b$ to the front or rear of the said upright.

A tray E is secured to the base A. The said tray is preferably located so that a portion of it is directly beneath the crank-hanger of the bicycle when the same is in position on the stand, and the edge of the tray is preferably turned upwardly, as shown at $e$, so that the tray will retain any grease or oil which may drop from the bearings in the crank-hanger. Again, this tray also serves to retain the balls of the bicycle, should they be taken out for purposes of cleaning, &c. Furthermore, the tray may be utilized for placing any of the different small parts of the bicycle thereon, as well as the tools for use in connection therewith.

Proceeding to describe the operation of my stand the bicycle to be supported therein is placed against the stand, with its crank-hanger resting within the bracket $b$. The brace C is then adjusted so that its opposite ends will engage the seat-post tube and the front lower brace of the bicycle. The brace is then securely locked to the upright by means of the bolt D and its thumb-nut $d$. The bicycle is then securely locked to the support, and the several parts of the same may be adjusted, if so desired, or the wheel may be simply left until desired to remove it.

The support B is preferably rigidly secured within the base A, so as to make the support firmer, and, if desired the stand A may be fastened down to the floor.

The stand may be used to support two bicycles by extending the upright B a considerable distance upwardly and providing it with another bracket $b$ and adjustable brace C.

What I claim is—

1. A bicycle-stand, comprising a suitable base, an upright secured therein, a bracket upon the upright in position to support the crank-hanger of a bicycle, a brace adjustably secured to the upright in position to engage the seat-post tube and lower front tube of the bicycle-frame and means for clamping the brace to the upright, substantially as set forth.

2. A bicycle-supporting stand, comprising a suitable base, an upright secured therein, a bracket secured to the upright in position to support the crank-hanger of a bicycle, a rotary and longitudinally-adjustable brace having a vertical adjustment with respect to the upright, the said brace being adapted to engage the seat-post tube and front lower tube of the bicycle-frame and means for securing the brace to the upright in any of its adjustments, substantially as set forth.

3. A bicycle-supporting stand, comprising a suitable base, an upright secured therein, a bracket on the upright adapted to support the crank-hanger of a bicycle, a cross-brace adapted to engage the seat-post tube and front lower tube of the bicycle-frame, the said upright and cross-brace having elongated slots therein and a clamping device passing through the said elongated slots for locking the cross-brace to the upright, substantially as set forth.

THEODORE TERRELL.

Witnesses:
FREDK. HAYNES,
ROBT. B. SEWARD.